May 31, 1955  J. H. HOLDERNESS  2,709,578
ROTARY IMPELLER HUMIDIFIER
Filed June 15, 1951  4 Sheets-Sheet 2

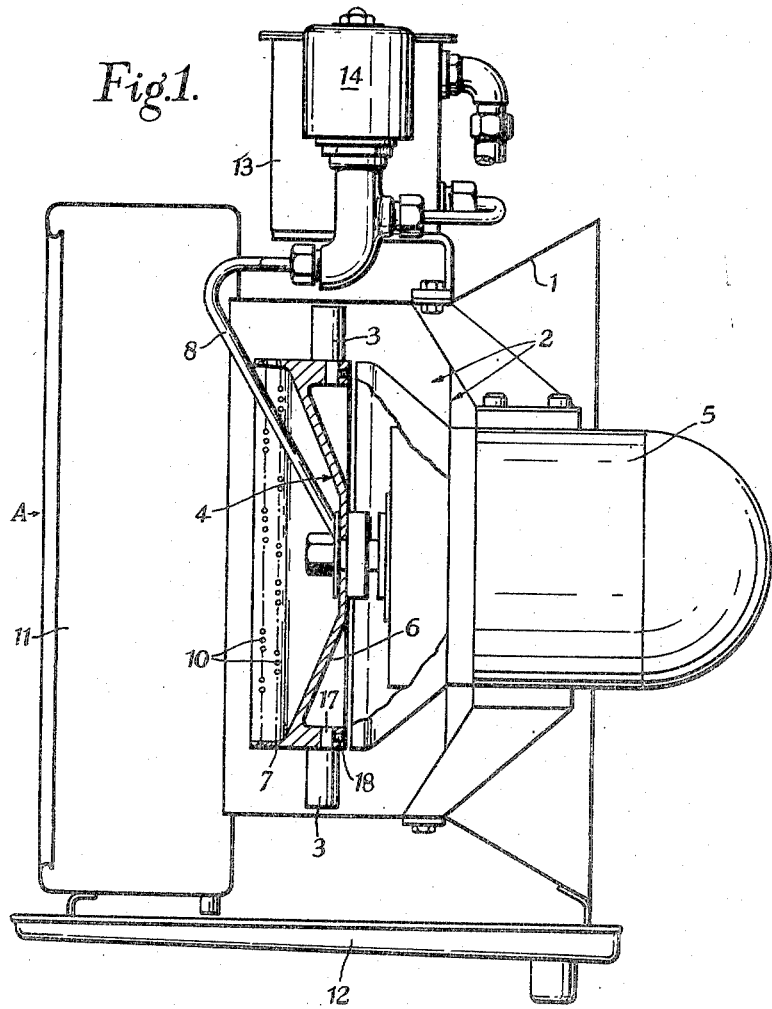
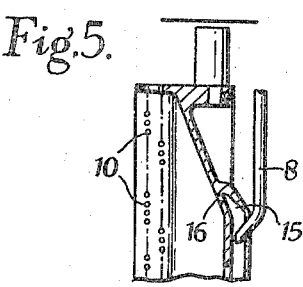

INVENTOR
John Henry Holderness
BY
*Wilfred E. Lawson*
ATTORNEY

May 31, 1955  J. H. HOLDERNESS  2,709,578
ROTARY IMPELLER HUMIDIFIER
Filed June 15, 1951  4 Sheets-Sheet 3

INVENTOR
John Henry Holderness
BY
Wilfred E. Lawson
ATTORNEY

May 31, 1955    J. H. HOLDERNESS    2,709,578
ROTARY IMPELLER HUMIDIFIER
Filed June 15, 1951    4 Sheets-Sheet 4

INVENTOR
John Henry Holderness
BY
Wilfred E. Lawson
ATTORNEY

# United States Patent Office 2,709,578
Patented May 31, 1955

2,709,578
ROTARY IMPELLER HUMIDIFIER

John Henry Holderness, Grays, England

Application June 15, 1951, Serial No. 231,846

3 Claims. (Cl. 261—30)

This invention concerns improvements in or relating to humidifiers and more particularly relates to a unit, machine, or plant, for producing a controlled atmosphere of high humidity.

The majority of industries whose product is of a hygroscopic nature and which is affected by moisture changes of the atmosphere have a direct need of controlled humidity to ensure conditions favourable to the best results in the manufacturing process of the product regarding moisture content, moisture regain, drying and cooling and like conditioning. Industries such as the Textile, Paper, Printing, Baking, Food, Tobacco, Leather, Ceramic and others are becoming more aware of the important part that controlled humidity plays in the production of high quality products.

Various methods of atomising water and circulating it into the atmosphere have been proposed, and apparatus for carrying out some of the methods has been installed, for example, water jets under pressure or combined with compressed air and/or steam, with or without circulating fans attached. Other apparatus comprises rotating discs and independent circulating fans, and humidifying has also been effected by capillary attraction and other atomising mediums.

An object of the present invention is to provide a machine or plant which is a self contained unit to supply water in a finely divided or atomized state combined with an adequate volume of air to partly absorb and to circulate the finely divided or atomized water either without or in conjunction with ducts, air filters, heaters and other auxiliary apparatus.

According to the invention there is provided a humidifier comprising a converging air inlet (for example, a cone) leading into a venturi or like tubular casing whose effective area diminishes from the inlet end to the outlet end, means for forcing air through said venturi, a rotating body or spinner within the venturi, said spinner having a perforated rim extending along the venturi or along the throughway of the whole air passage and means for supplying water to the interior of the rim whereby centrifugal force causes the water to be forced through the perforations and into the airstream through the venturi. By effective area is meant that part of the cross sectional area of the casing which is free for the passage of air.

The said spinner may be of dish-like shape in cross-section coaxial with the venturi and with the rim thereof extending parallel to its axis. The length of the rim, that is, parallel to its axis, will depend on the size of the venturi and the output desired and like factors. The spinner may comprise blades on its exterior whereby it functions as a fan to provide the airstream through the venturi. In a convenient construction such fan may be driven by a motor and the whole device mounted within the cone and venturi.

The invention will be more fully described with reference to the accompanying drawings in which:

Figure 1 is a sectional elevation of a humidifier constructed according to the invention.

Figures 3, 4 and 5 are sections of several different spinners showing modifications over the spinner shown in Figure 1.

Figure 2:
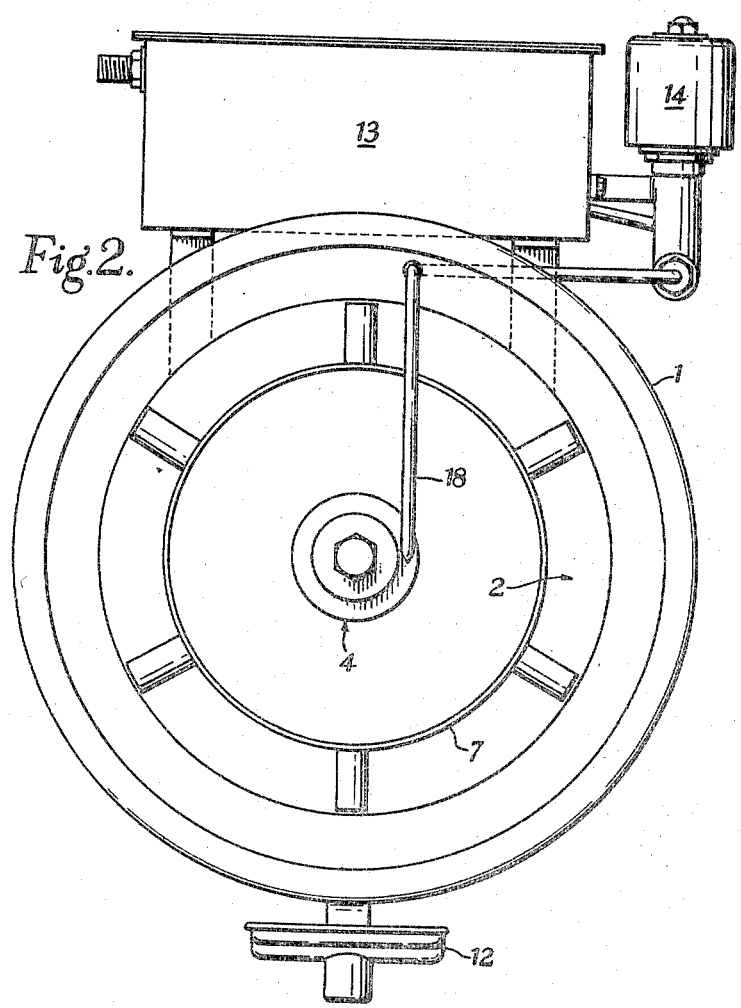
Figure 2 is a front elevation of Figure 1 looking in the direction of the arrow A.
Figure 6:
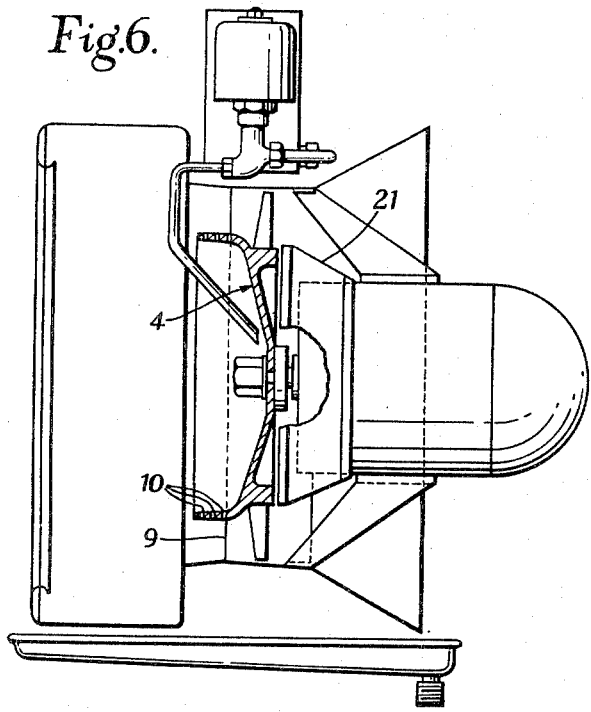
Figure 6 is a small scale diagram generally similar to Figure 1 but showing two details not present in that figure.

Referring to Figures 1 and 2, a humidifying unit consists of a converging air inlet cone 1 leading into a modified venturi 2 in which modified venturi is a motor, turbine or pulley driven fan 3 of the multi-bladed axial flow type, the blades of which fan are mounted around the periphery of a large diameter boss 4. As illustrated, the fan is driven by a motor 5. This boss hereafter termed a "spinner" is dished after the manner of a dished wheel, that is, it has a substantially radial or frusto-conical disc portion 6 with a rim 7 which extends substantially parallel with the axis of rotation so that a section of the spinner resembles the section of the upper part of a funnel. The rim itself may also be of frusto-conical form if desired. The outer face of the spinner 4 is so designed as to diameter, depth and shape as to ensure that a stream of water under automatic control, fed by a pipe 8 to the approximate centre of the spinner and within the dished part thereof will, by centrifugal force be dispersed tangentially over the surface of the disc portion and carried to the periphery in a thin film from whence it will pass to the inside of the rim coaxial with the shaft. In Figure 1 there is no choke in the venturi but a suitable arrangement is shown in Figure 6 if a choke is desired. The rim of the spinner may then be approximately in line with the vena-contracta 9 of the venturi. The said rim is perforated by a series of rows of holes 10 of a number and size so calculated as to pass the water in a number of finely divided jets through the rim. As the spinner rotates, the jets are thrown off tangentially into the air stream produced by the axial flow fan, so that they are split up and atomized either directly or after hitting the surface of the venturi, and the air and finely divided and atomized water passes to the atmosphere through an extension 11 of the venturi which may be a diverging or abrupt enlargement of the same. Alternatively the air and finely divided and atomized water may be passed to the atmosphere through ducts, and if necessary through eliminator plates to prevent unabsorbed particles of water being passed to the atmosphere. Any water not carried to atmosphere runs to waste after being collected by a drip tray 12.

The water supply for the unit is from a header tank 13 mounted on/or adjacent to the unit, the tank being fitted internally with a float valve (not shown) to maintain a constant head, the water passing from this header tank through an electrically operated valve 14 which is controlled from a humidistat of any suitable construction. The header tank may comprise a filter for the water so that water passing to the valve 14 is free of foreign particles.

The header tank is itself supplied from a main source (not shown) and it will be understood that the humidistat controls the amount of water delivered in response to the humidity of the room or workshop in which the humidifier is installed.

It will be understood that means for maintaining and controlling the desired ambient temperature may be incorporated in the unit in any known manner.

Figure 3:
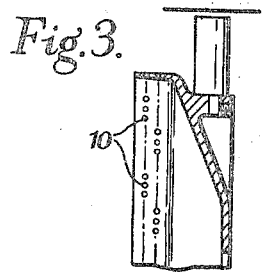
Figure 4:
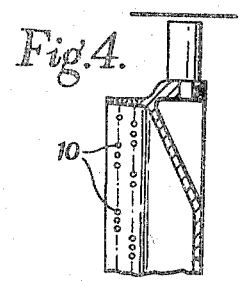

Several different shapes of spinner are shown in Figures 3 to 5. Figures 3 and 4 need no comment, but in Figure 5 the water supply is different from that shown in Figure 1. The pipe 8 comes down at the back of the spinner into an annular groove or recess 15 and water passes through holes 16 into the dished interior of the spinner thereafter out of the rim as before.

The fan blades may be adjustable as to number and pitch in order to vary the quantity and pressure of the air delivered thereby. As shown in Figure 1 the blades are mounted in the spinner rim by pivots 17 and these may be locked by screws 18.

Figure 7:
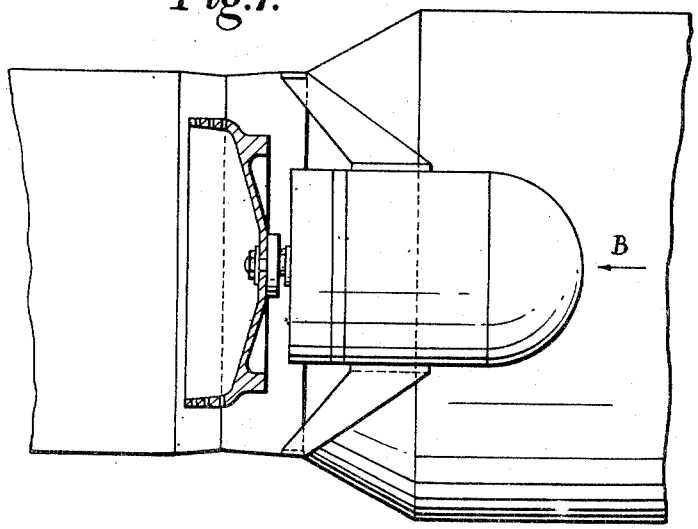
Figures 7 and 8 show modifications in the air supply arrangements.

The air can be supplied from a separate centrifugal or propeller fan in which case the blades of the axial flow fan may be omitted from the above described unit. This arrangement is shown diagrammatically in Figure 7 where the air stream from a fan (not shown) is indicated by an arrow B.

Figure 8:
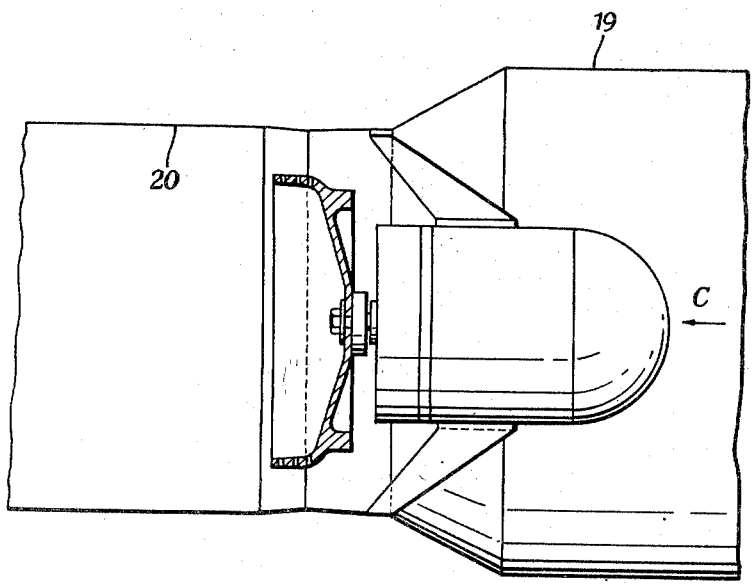

As shown in Figure 8 the spinner and venturi can be incorporated in ducting 19—20 supplied with air from a separate source, the air stream being indicated by an arrow C.

One or more units of the kind described above can be utilised as an air washer in conjunction with normal air conditioning plant.

As shown in Figure 6 a shroud 21 may be fitted between the motor and the rear end of the spinner to improve the air flow.

The humidifier above described in its several forms requires only a very small head of water, approximately 1 foot as distinct from existing types which require a high pressure. It is therefore possible to supply the water from a local header tank built into the unit as illustrated.

With apparatus of the kind described above atomisation and general control of the water passed into the atmosphere can be perfected to a very high degree and the water fed to the apparatus and not actually atomised reduced to a very small percentage of the supply from the header.

What I claim is:

1. A humidifier comprising a tubular casing having an inlet end and outlet end, said casing being of decreasing inside diameter from the inlet end through a portion of its length whereby the effective area diminishes from the inlet end to the outlet end, a spinner having a frusto-conical disc mounted within the casing for rotation on the longitudinal axis of the casing, a wide rim encircling said disc and extending substantially parallel with the axis of said disc, said rim being located in the portion of the casing of smaller diameter, said rim having perforations therethrough and therearound between said disc portion and the edges of the rim nearest to the outlet end of the casing, means for rotating the spinner, means mounted on a forwardly extending portion of said rim between the rim perforations and the inlet end of the casing for creating an air stream through the casing across the outside of the spinner rim from the larger inlet end of the smaller outlet end, and means for supplying water to the interior of said rim whereby the water is forced by centrifugal action through the rim perforations in jets into the said portion of smaller diameter and into the air stream flowing between the spinner and the adjacent casing wall.

2. A humidifier comprising a tubular casing having a conical inlet end portion leading into and joining a straight outlet end portion of reduced diameter, a motor mounted in the conical portion and having a shaft directed axially through the casing toward the outlet end, a shroud carried by the inner end of the motor around the shaft, said shroud flaring into and toward the said outlet end portion, a spinner having a frusto-conical disc secured on and concentric with the shaft and a wide rim encircling the disc portion and extending substantially parallel with the axis of the shaft and disposed within and spaced from the wall of said straight outlet end portion, said rim having perforations therethrough and therearound between the said disc portion and the edge of the rim nearest to the outlet end of the casing, said rim having an outside diameter at least as great as the maximum diameter of the shroud, means located in the casing between the rim perforations and said inlet end for creating an air stream through the casing from the inlet end to the outlet end, and means for supplying water to the interior of the rim on the side of the disc portion nearest to said perforations whereby the water is forced by centrifugal action through the rim perforations in jets into the said portion of reduced diameter and into the air stream flowing between the spinner and the adjacent casing wall.

3. A humidifier according to claim 2, wherein said means for creating an air stream through the casing comprises fan blades secured to the outside peripheral face of the rim and extending across the space between the rim and the encircling wall of the casing.

References Cited in the file of this patent

UNITED STATES PATENTS

| | | |
|---|---|---|
| 1,524,777 | Braemer | Feb. 3, 1925 |
| 1,694,453 | Spaulding | Dec. 11, 1928 |
| 1,730,866 | Sternberg | Oct. 8, 1929 |
| 1,752,045 | Wagner | Mar. 25, 1930 |
| 2,048,017 | McElvain | July 21, 1936 |
| 2,163,474 | Sloan | June 20, 1939 |
| 2,219,826 | Swinburne et al. | Oct. 29, 1940 |
| 2,571,069 | Shearman | Oct. 9, 1951 |

FOREIGN PATENTS

| | | |
|---|---|---|
| 452,539 | Italy | Oct. 25, 1949 |